United States Patent
Welty et al.

(10) Patent No.: US 10,196,210 B2
(45) Date of Patent: Feb. 5, 2019

(54) DISPLAY FOR IMPROVED EFFICIENCY IN ROBOT ASSISTED ORDER-FULFILLMENT OPERATIONS

(71) Applicant: Locus Robotics Corp., Wilmington, MA (US)

(72) Inventors: Bruce Welty, Boston, MA (US); Sean Johnson, Danvers, MA (US); Luis Jaquez, Burlington, MA (US); Michael Charles Johnson, Ashland, MA (US)

(73) Assignee: Locus Robotics Corp., Wilmington, MA (US)

( * ) Notice: Subject to any disclaimer, the term of this patent is extended or adjusted under 35 U.S.C. 154(b) by 130 days.

(21) Appl. No.: 15/406,862

(22) Filed: Jan. 16, 2017

(65) Prior Publication Data
US 2018/0201444 A1  Jul. 19, 2018

(51) Int. Cl.
| | |
|---|---|
| G06F 7/00 | (2006.01) |
| G06F 19/00 | (2018.01) |
| B65G 1/04 | (2006.01) |
| B65G 1/137 | (2006.01) |
| B25J 5/00 | (2006.01) |
| G06Q 10/08 | (2012.01) |
| G06Q 50/28 | (2012.01) |

(52) U.S. Cl.
CPC .......... *B65G 1/0492* (2013.01); *B25J 5/007* (2013.01); *B65G 1/1373* (2013.01); *G06Q 10/08* (2013.01); *G06Q 50/28* (2013.01)

(58) Field of Classification Search
None
See application file for complete search history.

(56) References Cited

U.S. PATENT DOCUMENTS

| | | | | |
|---|---|---|---|---|
| 2006/0111811 | A1* | 5/2006 | Okamoto | B25J 5/007 700/214 |
| 2007/0192910 | A1* | 8/2007 | Vu | B25J 5/007 700/245 |
| 2013/0317642 | A1 | 11/2013 | Asaria et al. | |
| 2016/0101940 | A1 | 4/2016 | Grinnell et al. | |
| 2017/0225336 | A1* | 8/2017 | Deyle | B25J 13/086 |
| 2018/0029797 | A1* | 2/2018 | Hance | B65G 1/1373 |

FOREIGN PATENT DOCUMENTS

WO  2013074969 A1  5/2013

* cited by examiner

*Primary Examiner* — Yolanda R Cumbess
(74) *Attorney, Agent, or Firm* — Verrill Dana, LLP; John W. Powell

(57) ABSTRACT

A robot capable of autonomously navigating through a warehouse to execute orders on items at locations in the warehouse with the assistance of the human operators. There is a mobile base unit and a display device associated with the mobile base unit having a display area to allow the human operators to interact with the robot. And, there is a processor configured to display on a first portion of the display area information corresponding to an item on which an operator is to assist the robot execute the order at a first location and to display on a second portion of the display area icons representing other robots within a predetermined area surrounding the first location.

18 Claims, 12 Drawing Sheets

| Fiducial ID | x | y | z | quaternion.x | quaternion.y | quaternion.z | quaternion.w |
|---|---|---|---|---|---|---|---|
| 1 | -10.2 | 2.3 | 0 | 0 | 0 | 0 | 1 |
| 2 | 23.1 | 15.8 | 0 | 0 | 0 | 0 | 1 |
| 3 | 45.3 | 3.3 | 0 | 0 | 0 | -1 | 0 |

| Location | Fiducial ID |
|---|---|
| L01001A | 11 |
| L01001B | 11 |
| L01001C | 11 |
| L01001D | 11 |
| L01001E | 11 |
| L01001F | 11 |
| L01002A | 12 |
| L01002B | 12 |
| L01002C | 12 |
| L01002D | 12 |
| L01002E | 12 |
| L01003A | 13 |
| L01003B | 13 |
| L01003C | 13 |
| L01003D | 13 |
| L01003E | 13 |
| L01003F | 13 |
| L01004A | 14 |
| L01004B | 14 |
| L01004C | 14 |
| L01004D | 14 |
| L01004E | 14 |
| L01005A | 15 |
| L01005B | 15 |
| L01005C | 15 |
| L01005D | 15 |
| L01005E | 15 |
| L01005F | 15 |

FIG. 7

DISPLAY FOR IMPROVED EFFICIENCY IN ROBOT ASSISTED ORDER-FULFILLMENT OPERATIONS

FIELD OF INVENTION

This invention relates to a display for improving efficiency in robot-assisted order-fulfillment operations and more particularly to such a display which provides an image of an area around the robot to allow a human operator assisting the robot with an order to view icons representing other robots in the area and their status to improve efficiency in order processing.

BACKGROUND

Ordering products over the internet for home delivery is an extremely popular way of shopping. Fulfilling such orders in a timely, accurate and efficient manner is logistically challenging to say the least. Clicking the "check out" button in a virtual shopping cart creates an "order." The order includes a listing of items that are to be shipped to a particular address. The process of "fulfillment" involves physically taking or "picking" these items from a large warehouse, packing them, and shipping them to the designated address. An important goal of the order-fulfillment process is thus to ship as many items in as short a time as possible.

The order-fulfillment process typically takes place in a large warehouse that contains many products, including those listed in the order. Among the tasks of order fulfillment is therefore that of traversing the warehouse to find and collect the various items listed in an order. In addition, the products that will ultimately be shipped first need to be received in the warehouse and stored or "placed" in storage bins in an orderly fashion throughout the warehouse so they can be readily retrieved for shipping.

In a large warehouse, the goods that are being delivered and ordered can be stored in the warehouse very far apart from each other and dispersed among a great number of other goods. With an order-fulfillment process using only human operators to place and pick the goods requires the operators to do a great deal of walking and can be inefficient and time consuming. Since the efficiency of the fulfillment process is a function of the number of items shipped per unit time, increasing time reduces efficiency.

Robot assisted order-fulfillment systems have been used to increase efficiency and productivity. Such systems which utilize human operators to work in conjunction with robots have been demonstrated to provide significant improvements in efficiencies. Based on instructions received from a robot an operator may be used to select one or more items from shelving proximate the robot and place the selected item(s) on the robot. The robot would then move to one or more additional locations to retrieve other items which would be selected from shelving by other operators. Once the robot has completed "picking" its order, it travels to a packing station where operators package the items and ship them to customers.

Similarly, a robot may be assigned to "place" a number of items in various locations dispersed throughout the warehouse. In performing this function, the robot would begin at an operator station and be loaded with items and instructions regarding the locations of the items to be stored in the warehouse. The robot would make its round trip dropping off items at various locations with the assistance of operators and then return to the operator station.

There are, however, inefficiencies with these system and improvements are needed to further increase efficiency and throughput of such robot assisted order-fulfillment systems.

SUMMARY

In one aspect the invention features a robot capable of autonomously navigating through a warehouse among a plurality of other robots and a plurality of human operators, wherein the robots are configured to execute orders on items at locations in the warehouse with the assistance of the human operators, the robot. There is a mobile base unit to propel the robot through the warehouse to locations corresponding to items in an order to be executed. There is a display device associated with the mobile base unit having a display area to allow the human operators to interact with the robot. In addition, there is a processor, in communication with the display device, configured to display on a first portion of the display area information corresponding to an item on which an operator is to assist the robot execute the order at a first location. The processor is also configured to display on a second portion of the display area icons representing other robots within a predetermined area surrounding the first location.

In other aspects of the invention, one or more of the following features may be included. The display device may be affixed to the mobile base unit. The information on the first portion of the display area may include one or more of bar code identification, bin location, item description, item quantity, item size, item image, and item color. The warehouse may be divided into a plurality of regions and the predetermined area surrounding the robot may be one of the plurality of regions in which the robot is located. The processor may be in communication with a management server and the status indicators of the other robots may be received from the management server. The icons of the other robots may include a status indicator to allow the operator to select a next robot of the other robots to assist in executing an order. The status indicator of the other robots may comprise at least one of a color, a number, a change in intensity of the image of the icon, a blinking, flashing, or pulsing of the icon. The display device may include an input device for enabling the operator to select one of the other robots to assist in executing an order and the management server may be configured to change the status of the other robot selected by the operator to indicate that said other robot has been selected by the operator.

In another aspect the invention features a method for autonomously navigating a robot through a warehouse among a plurality of other robots and a plurality of human operators, wherein the robots are configured to execute orders on items at locations in the warehouse with the assistance of the human operators. The method includes propelling a mobile base unit of the robot through the warehouse to a first location corresponding to an item in an order to be executed. The method also includes displaying on a first portion of a display device having a display area to allow the human operators to interact with the robot information corresponding to the item on which an operator is to assist the robot execute the order, and displaying on a second portion of the display device icons representing other robots within a predetermined area surrounding the first location.

In other aspects of the invention, one or more of the following features may be included. The display device may be affixed to the mobile base unit. The information on the first portion of the display may include one or more of bar code identification, bin location, item description, item quantity, item size, item image, and item color. The warehouse may be divided into a plurality of regions and the predetermined area surrounding the robot may be one of the plurality of regions in which the robot is located at the first location. The icons of the other robots may include a status indicator to allow the operator to select a next robot of the other robots to assist in executing an order. The method may further comprise receiving from a management server the status indicators of the other robots. The status indicator of the other robots may comprise at least one of a color, a number, a change in intensity of the image of the icon, a blinking, flashing, or pulsing of the icon. The method may additionally comprise selecting by the operator, using the display device, one of the other robots to assist in executing an order and changing the status of the other robot selected by the operator to indicate that said other robot has been selected by the operator.

An object of the invention is to provide a display for an autonomous robot which projects an image of an area around a robot to allow a human operator assisting the robot with an order to view icons representing other robots in the area and their status to improve efficiency in order processing by directing the operator to the appropriate robot for the operator's next order operation.

These and other features of the invention will be apparent from the following detailed description and the accompanying figures, in which:

BRIEF DESCRIPTION OF THE FIGURES

FIG. 6 is a table of the fiducial identification to pose mapping;

FIG. 7 is a table of the bin location to fiducial identification mapping;

DETAILED DESCRIPTION

Figure 1:
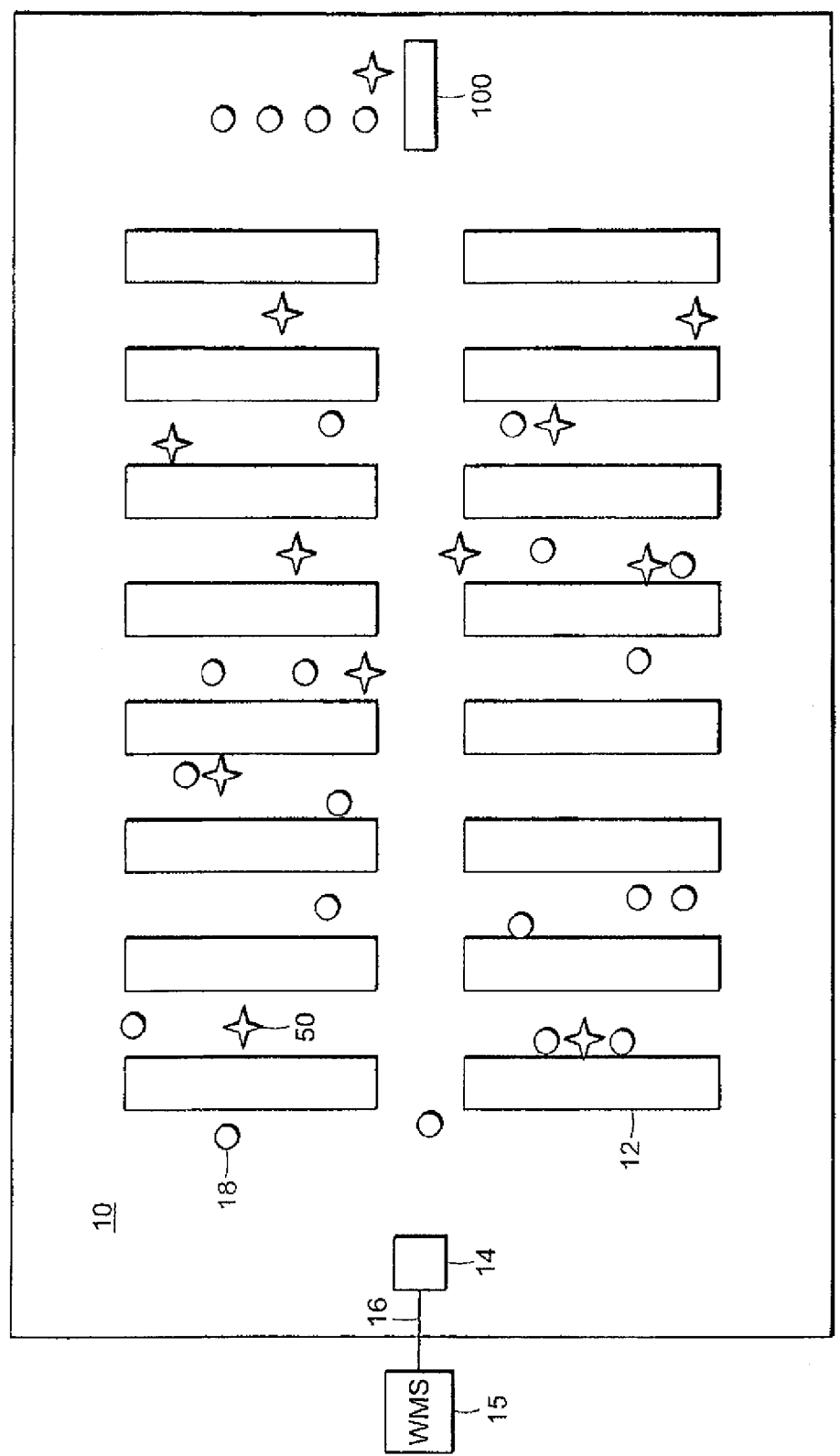
FIG. 1 is a top plan view of an order-fulfillment warehouse.

Referring to FIG. 1, a typical order-fulfillment warehouse 10 includes shelves 12 filled with the various items that could be included in an order 16. In operation, the order 16 from warehouse management server 15 arrives at an order-server 14. The order-server 14 communicates the order 16 to a robot 18 selected from a plurality of robots that roam the warehouse 10.

Figure 2:
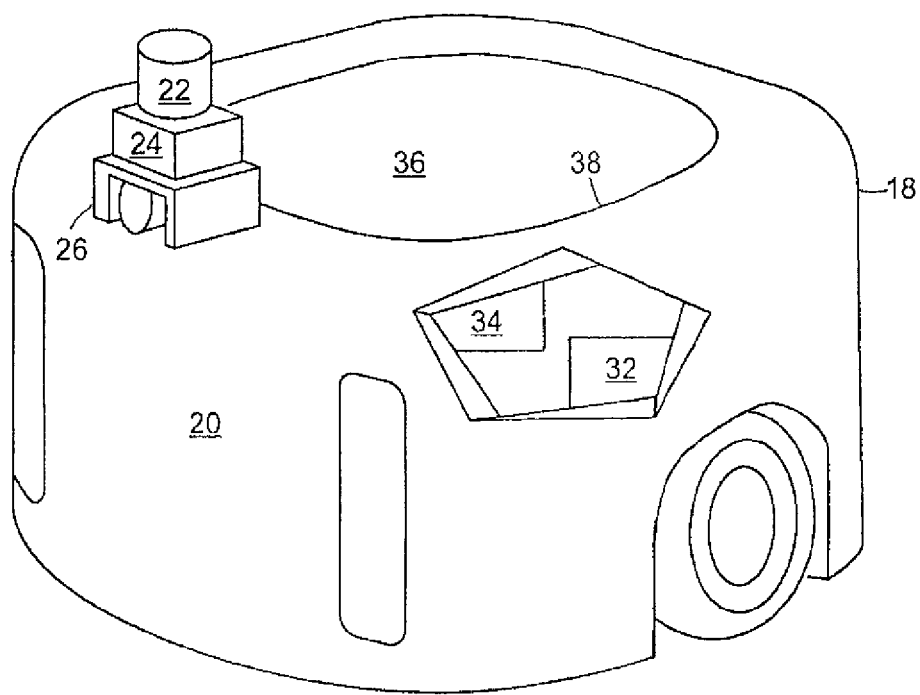
FIG. 2 is a perspective view of a base of one of the robots used in the warehouse shown in FIG. 1.
Figure 3:
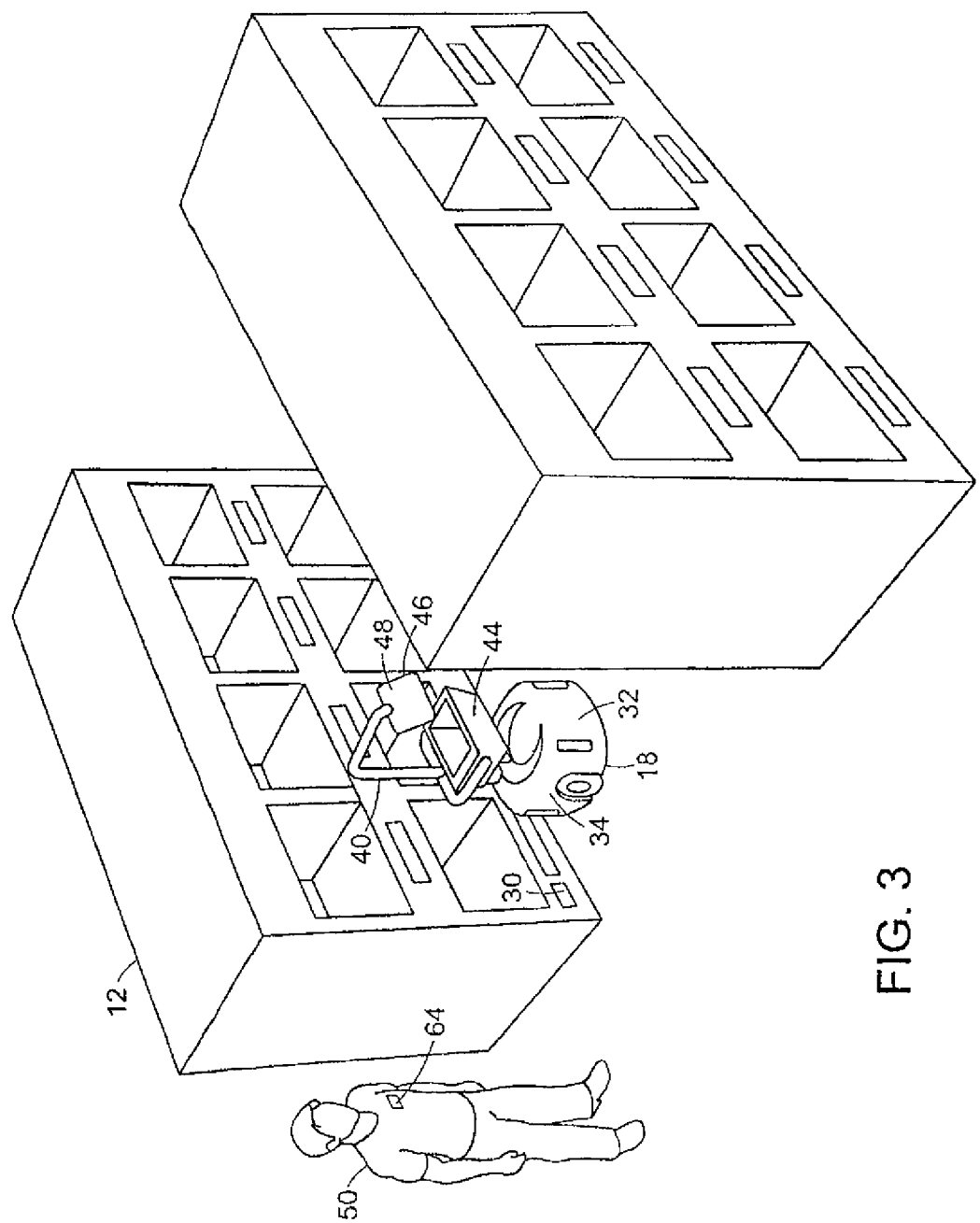
FIG. 3 is a perspective view of the robot in FIG. 2 outfitted with an armature and parked in front of a shelf shown in FIG. 1.

In a preferred embodiment, a robot 18, shown in FIG. 2, includes an autonomous wheeled base 20 having a laser-radar 22. The base 20 also features a transceiver 24 that enables the robot 18 to receive instructions from the order-server 14, and a camera 26. The base 20 also features a processor 32 that receives data from the laser-radar 22 and the camera 26 to capture information representative of the robot's environment and a memory 34 that cooperate to carry out various tasks associated with navigation within the warehouse 10, as well as to navigate to fiducial marker 30 placed on shelves 12, as shown in FIG. 3. Fiducial marker 30 (e.g. a two-dimensional bar code) corresponds to bin/location of an item ordered. The navigation approach of this invention is described in detail below with respect to FIGS. 4-8.

While the initial description provided herein is focused on picking items from bin locations in the warehouse to fulfill an order for shipment to a customer, the system is equally applicable to the storage or placing of items received into the warehouse in bin locations throughout the warehouse for later retrieval and shipment to a customer. The invention is also applicable to inventory control tasks associated with such a warehouse system, such as, consolidation, counting, verification, inspection and clean-up of products.

Robots 18, while executing a single order traveling throughout the warehouse 10, may be picking items, placing items, and performing inventory control tasks. This kind of interleaved task approach can significantly improve efficiency and performance.

Referring again to FIG. 2, An upper surface 36 of the base 20 features a coupling 38 that engages any one of a plurality of interchangeable armatures 40, one of which is shown in FIG. 3. The particular armature 40 in FIG. 3 features a tote-holder 42 for carrying a tote 44 that receives items, and a tablet holder 46 for supporting a tablet 48. In some embodiments, the armature 40 supports one or more totes for carrying items.

In other embodiments, the base 20 supports one or more totes for carrying received items. As used herein, the term "tote" or "container" includes, without limitation, cargo holders, bins, cages, shelves, rods from which items can be hung, caddies, crates, racks, stands, trestle, boxes, canisters, vessels, and repositories. There may also be used a storage array having an array of two or more totes or containers which are affixed to one another or a single unit having multiple compartments. Each of the totes/containers or compartments may be associated with a separate order or multiple totes/containers/compartments may be used for and associated with a single larger order.

Although a robot 18 excels at moving around the warehouse 10, with current robot technology, it is not very good at quickly and efficiently picking items from a shelf and placing them on the tote 44 due to the technical difficulties associated with robotic manipulation of objects. A more efficient way of picking items is to use a local operator 50, which is typically human, to carry out the task of physically removing an ordered item from a shelf 12 and placing it on robot 18, for example, in tote 44. The robot 18 communicates the order to the local operator 50 via the tablet 48, which the local operator 50 can read, or by transmitting the order to a handheld device used by the local operator 50.

Upon receiving an order 16 from the order server 14, the robot 18 proceeds to a first warehouse location, e.g. shown in FIG. 3. It does so based on navigation software stored in the memory 34 and carried out by the processor 32. The navigation software relies on data concerning the environment, as collected by the laser-radar 22, an internal table in memory 34 that identifies the fiducial identification ("ID") of fiducial marker 30 that corresponds to a location in the warehouse 10 where a particular item can be found, and the camera 26 to navigate.

Upon reaching the correct location, the robot 18 parks itself in front of a shelf 12 on which the item is stored and waits for a local operator 50 to retrieve the item from the shelf 12 and place it in tote 44. If robot 18 has other items to retrieve it proceeds to those locations. The item(s) retrieved by robot 18 are then delivered to a packing station 100, FIG. 1, where they are packed and shipped.

It will be understood by those skilled in the art that each robot may be fulfilling one or more orders and each order may consist of one or more items. Typically, some form of route optimization software would be included to increase efficiency, but this is beyond the scope of this invention and is therefore not described herein.

In order to simplify the description of the invention, a single robot 18 and operator 50 are described. However, as is evident from FIG. 1, a typical fulfillment operation includes many robots and operators working among each other in the warehouse to fill a continuous stream of orders.

The navigation approach of this invention, as well as the semantic mapping of a SKU of an item to be retrieved to a fiducial ID/pose associated with a fiducial marker in the warehouse where the item is located, is described in detail below with respect to FIGS. 4-8.

Using one or more robots 18, a map of the warehouse 10 must be created and the location of various fiducial markers dispersed throughout the warehouse must be determined. To do this, one of the robots 18 navigates the warehouse and builds a map 10a, FIG. 4, utilizing its laser-radar 22 and simultaneous localization and mapping (SLAM), which is a computational problem of constructing or updating a map of an unknown environment. Popular SLAM approximate solution methods include the particle filter and extended Kalman filter. The SLAM Mapping approach is the preferred approach, but any suitable SLAM approach can be used.

Robot 18 utilizes its laser-radar 22 to create map 10a of warehouse 10 as robot 18 travels throughout the space identifying, open space 112, walls 114, objects 116, and other static obstacles, such as shelf 12, in the space, based on the reflections it receives as the laser-radar scans the environment.

Figure 4:
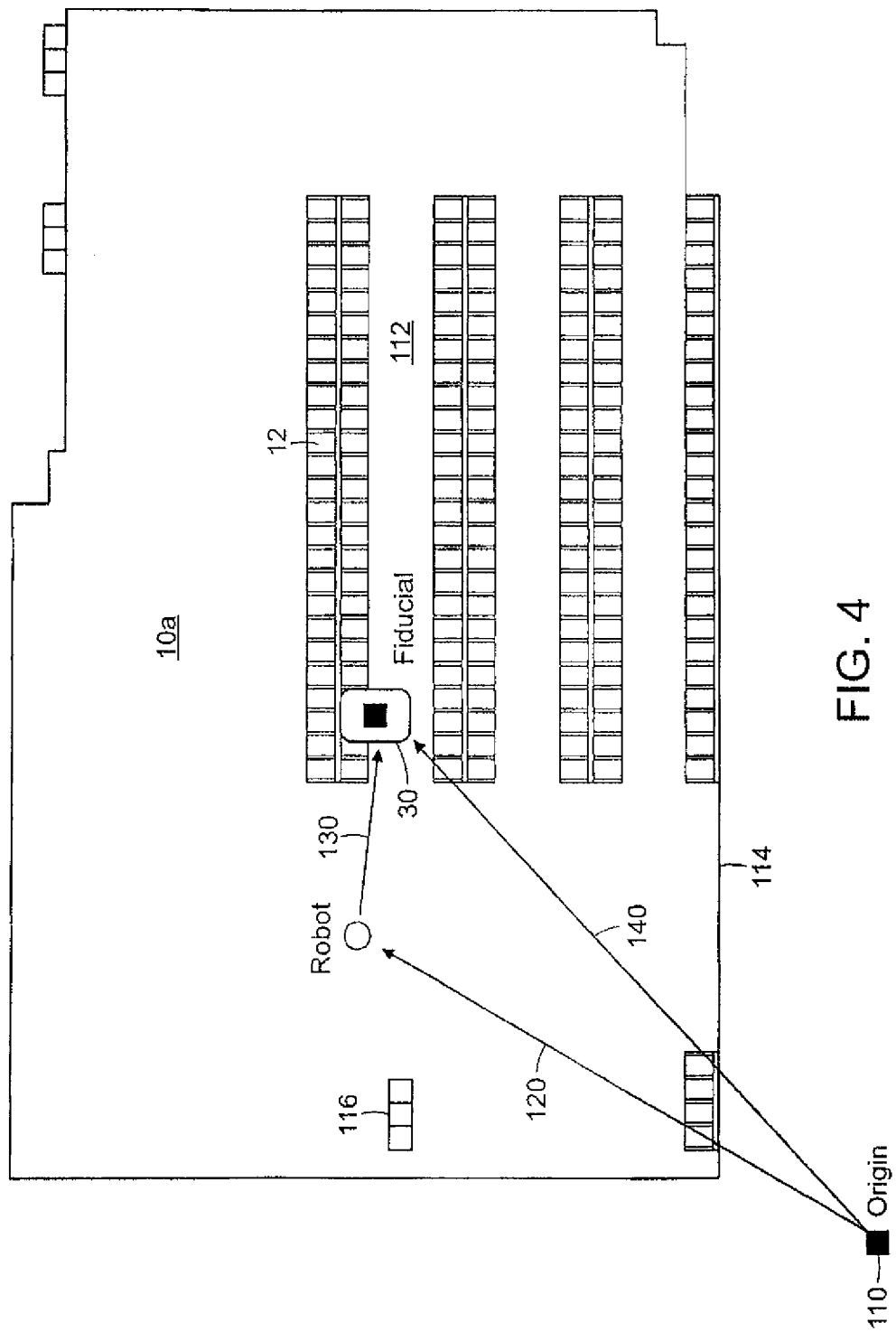
FIG. 4 is a partial map of the warehouse of FIG. 1 created using laser radar on the robot.

While constructing the map 10a or thereafter, one or more robots 18 navigates through warehouse 10 using camera 26 to scan the environment to locate fiducial markers (two-dimensional bar codes) dispersed throughout the warehouse on shelves proximate bins, such as 32 and 34, FIG. 3, in which items are stored. Robots 18 use a known starting point or origin for reference, such as origin 110. When a fiducial marker, such as fiducial marker 30, FIGS. 3 and 4, is located by robot 18 using its camera 26, the location in the warehouse relative to origin 110 is determined.

By the use of wheel encoders and heading sensors, vector 120, and the robot's position in the warehouse 10 can be determined. Using the captured image of a fiducial marker/two-dimensional barcode and its known size, robot 18 can determine the orientation with respect to and distance from the robot of the fiducial marker/two-dimensional barcode, vector 130. With vectors 120 and 130 known, vector 140, between origin 110 and fiducial marker 30, can be determined. From vector 140 and the determined orientation of the fiducial marker/two-dimensional barcode relative to robot 18, the pose (position and orientation) defined by a quaternion (x, y, z, ω) for fiducial marker 30 can be determined.

Figure 5:
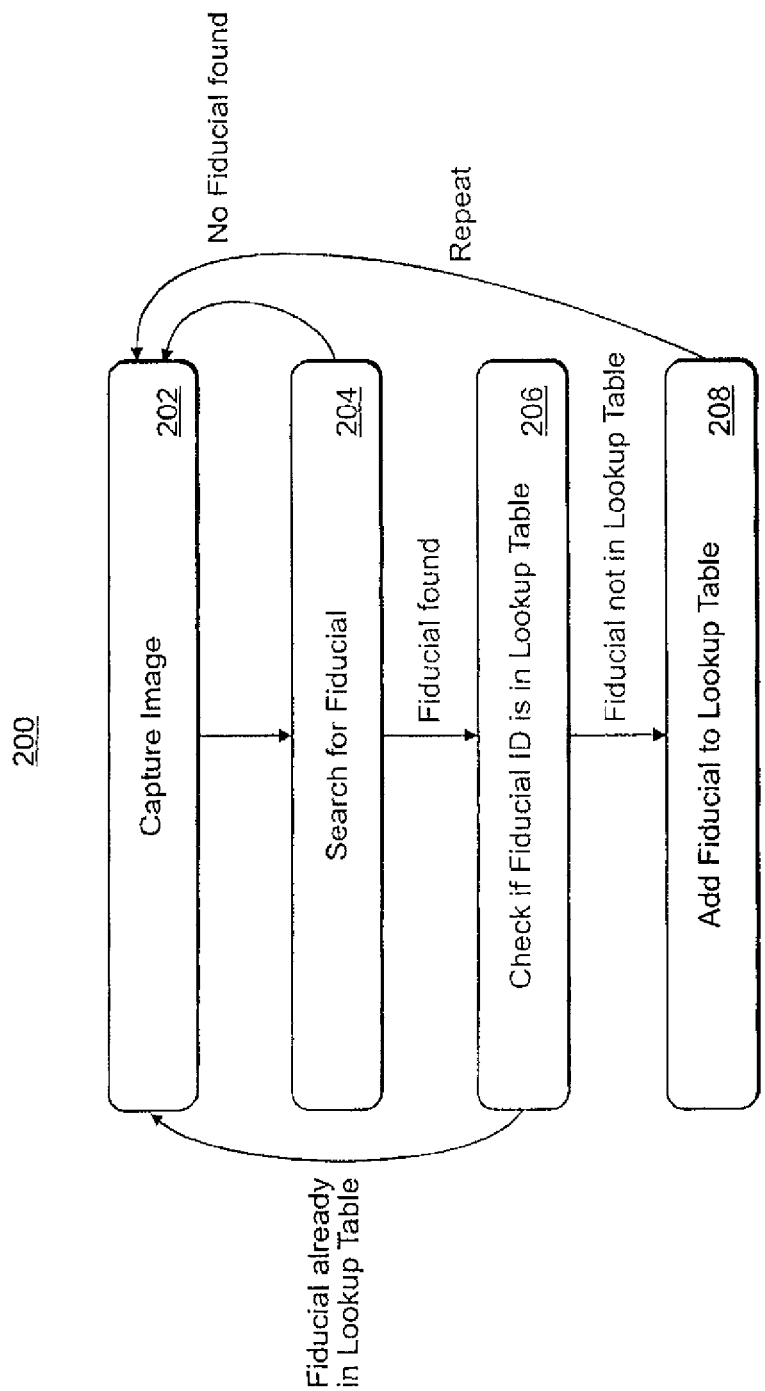
FIG. 5 is a flow chart depicting the process for locating fiducial markers dispersed throughout the warehouse and storing fiducial marker poses.

Flow chart 200, FIG. 5, describing the fiducial marker location process is described. This is performed in an initial mapping mode and as robot 18 encounters new fiducial markers in the warehouse while performing picking, placing and/or other tasks. In step 202, robot 18 using camera 26 captures an image and in step 204 searches for fiducial markers within the captured images. In step 206, if a fiducial marker is found in the image (step 204) it is determined if the fiducial marker is already stored in fiducial table 300, FIG. 6, which is located in memory 34 of robot 18. If the fiducial information is stored in memory already, the flow chart returns to step 202 to capture another image. If it is not in memory, the pose is determined according to the process described above and in step 208, it is added to fiducial to pose lookup table 300.

In look-up table 300, which may be stored in the memory of each robot, there are included for each fiducial marker a fiducial identification, 1, 2, 3, etc, and a pose for the fiducial marker/bar code associated with each fiducial identification. The pose consists of the x, y, z coordinates in the warehouse along with the orientation or the quaternion (x, y, z, ω).

In another look-up Table 400, FIG. 7, which may also be stored in the memory of each robot, is a listing of bin locations (e.g. 402a-f) within warehouse 10, which are correlated to particular fiducial ID's 404, e.g. number "11". The bin locations, in this example, consist of seven alpha-numeric characters. The first six characters (e.g. L01001) pertain to the shelf location within the warehouse and the last character (e.g. A-F) identifies the particular bin at the shelf location. In this example, there are six different bin locations associated with fiducial ID "11". There may be one or more bins associated with each fiducial ID/marker.

The alpha-numeric bin locations are understandable to humans, e.g. operator 50, FIG. 3, as corresponding to a physical location in the warehouse 10 where items are stored. However, they do not have meaning to robot 18. By mapping the locations to fiducial ID's, Robot 18 can determine the pose of the fiducial ID using the information in table 300, FIG. 6, and then navigate to the pose as described herein.

Figure 8:
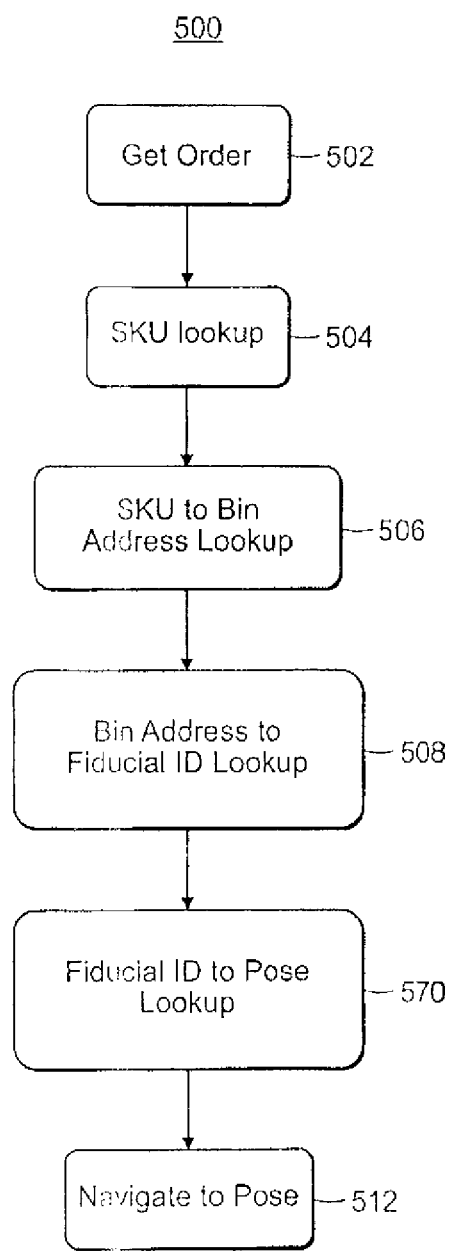
FIG. 8 is a flow chart depicting product SKU to pose mapping process.

The order fulfillment process according to this invention is depicted in flow chart 500, FIG. 8. In step 502, warehouse management system 15, FIG. 1, obtains an order, which may consist of one or more items to be retrieved. In step 504 the SKU number(s) of the items is/are determined by the warehouse management system 15, and from the SKU number(s), the bin location(s) is/are determined in step 506. A list of bin locations for the order is then transmitted to robot 18. In step 508, robot 18 correlates the bin locations to fiducial ID's and from the fiducial ID's, the pose of each fiducial ID is obtained in step 510. In step 512 the robot 18 navigates to the pose as shown in FIG. 3, where an operator can pick the item to be retrieved from the appropriate bin and place it on the robot.

Item specific information, such as SKU number and bin location, obtained by the warehouse management system 15, can be transmitted to tablet 48 on robot 18 so that the operator 50 can be informed of the particular items to be retrieved when the robot arrives at each fiducial marker location.

With the SLAM map and the pose of the fiducial ID's known, robot 18 can readily navigate to any one of the fiducial ID's using various robot navigation techniques. The preferred approach involves setting an initial route to the fiducial marker pose given the knowledge of the open space 112 in the warehouse 10 and the walls 114, shelves (such as shelf 12) and other obstacles 116. As the robot begins to traverse the warehouse using its laser radar 26, it determines if there are any obstacles in its path either fixed or dynamic, such as other robots 18 and/or operators 50 and iteratively updates its path to the pose of the fiducial marker. The robot re-plans its route about once every 50 milliseconds, constantly searching for the most efficient and effective path while avoiding obstacles.

Figure 9:
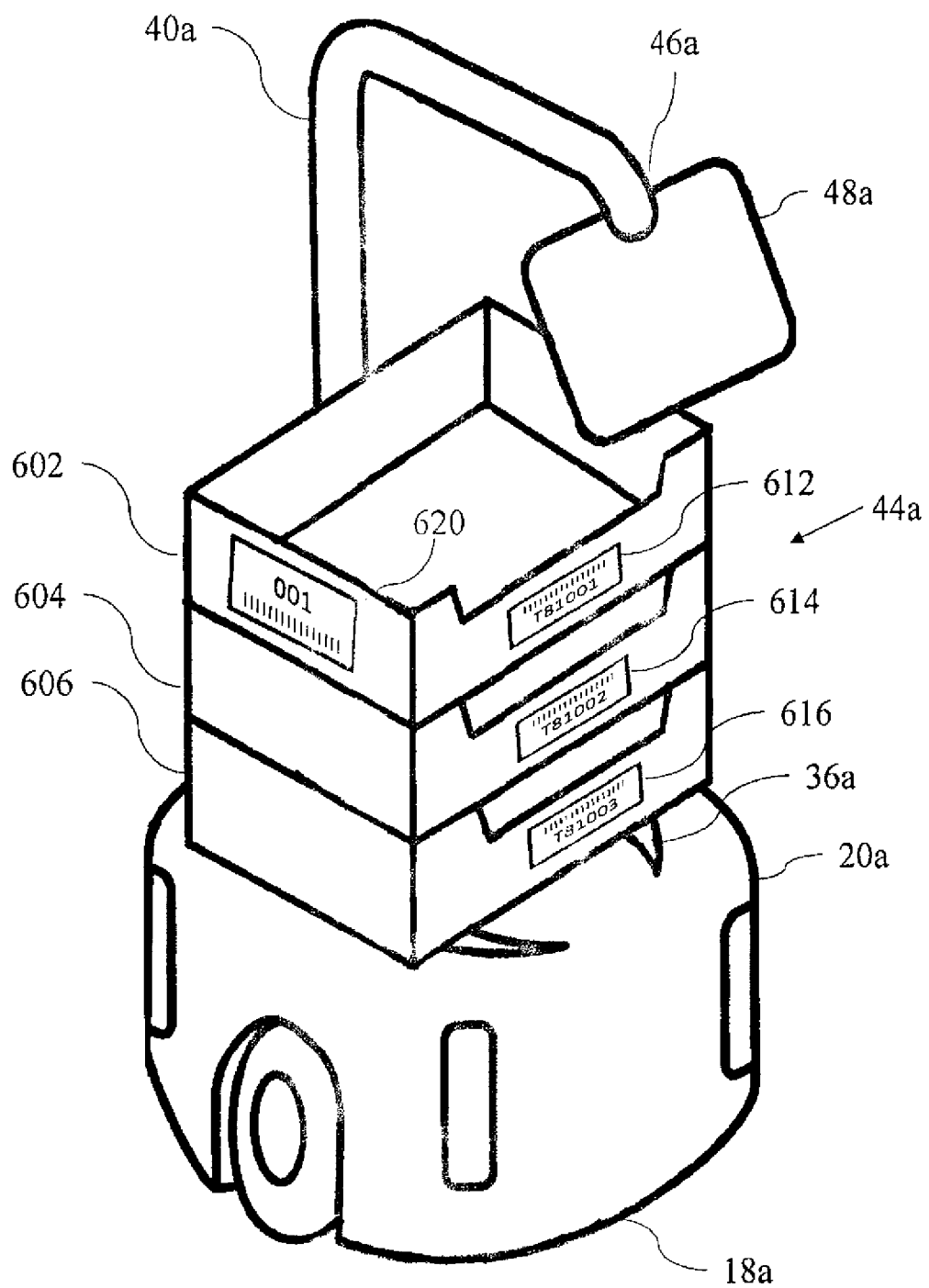
FIG. 9 is a perspective view of the robot in FIG. 3 outfitted with an armature and a storage array according to the invention.

As described above, a storage array having two or more totes or containers which are affixed to one another or a single unit having multiple compartments may be used to increase efficiency. The terms totes, containers, and compartments (among other terms described above) may be used interchangeably herein. One embodiment of the storage array according to this invention is described with regard to FIG. 9. Robot 18a is shown to include an upper surface 36a of a wheeled base 20a. There is an armature 40a which at a first end is connected to wheeled base 20a (connection not visible in this view) and at its other end it connects to tablet holder 46a for supporting a tablet 48a. Unlike armature 40, FIG. 3, armature 40a does not include a tote-holder 42 for carrying a tote 44 that receives items. Instead, the storage array 44a is placed on upper surface 36a of wheeled base 20a.

In this embodiment, storage array 44a includes three storage containers 602, 604, and 606, which are vertically stacked upon each other and are fixedly interconnected to form an integrated array. Each container 602, 604, and 606 in storage array 44a includes a bar code disposed on bar code labels 612, 614, and 616, respectively. Also on each bar code label is a number associated with each container, which may be read by a human operator, such as operator 50a, FIG. 10, to identify the different containers. The numbers in this example are "T81001", "T81002", and "T81003" associated with containers 602, 604, and 606, respectively. In order to make it easier to distinguish among the containers, they may be colored differently. For example, container 602, may be colored blue in whole or in part. Container 604, may be colored yellow in whole or in part and container 606, may be colored green in whole or in part.

In addition, there is included a bar code label 620, which is associated with the storage array 44a. The bar code label 620 also includes a storage array identification number, in this case "001", for the operator 50a to identify it among the various storage arrays. Bar code label 620 is positioned on a side of container 602, but this label could be positioned in various locations on the storage array.

Figure 10:
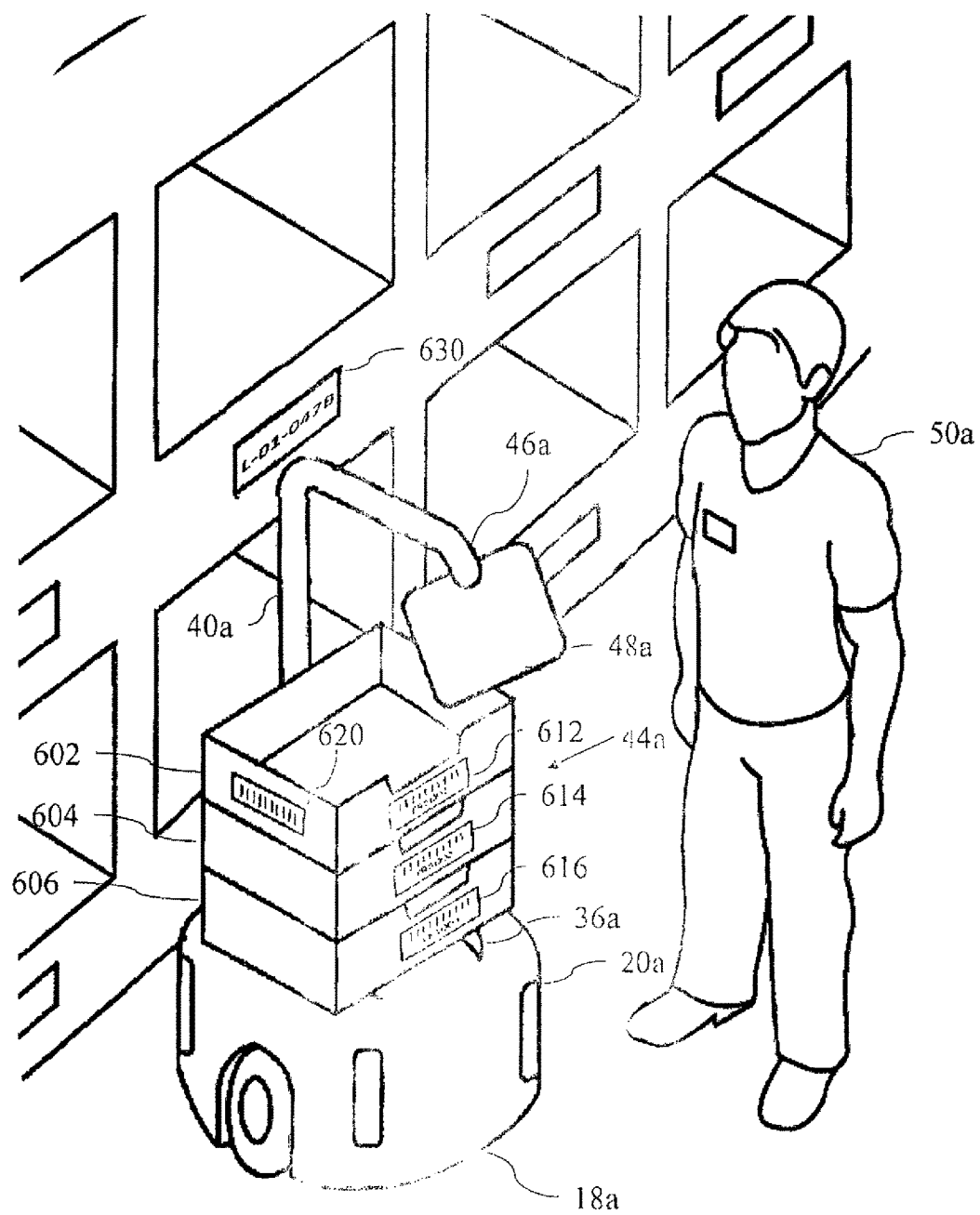
FIG. 10 is a perspective view of the robot and storage array of FIG. 9 parked in front of a shelf.
Figure 11:
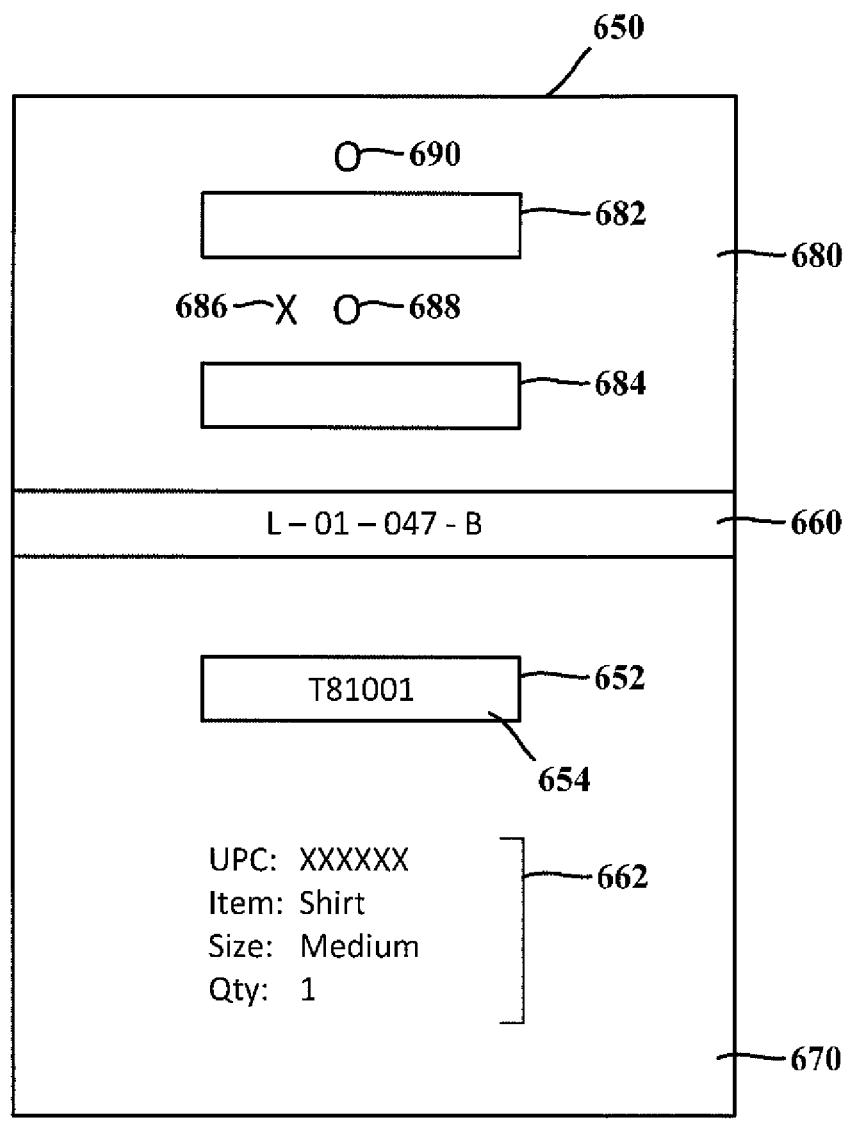
FIG. 11 is a view of the display of the tablet of the robot shown in FIGS. 9 and 10.

Once at a location, such as the location shown in FIG. 10, the robot 18a may communicate a pick task to operator 50a via tablet 48a. As depicted in FIG. 11, the display 650 of tablet 48a shows the container number "T81001" at location 652, which corresponds to container 602 of storage array 44a. This tells the operator that the item to be picked needs to be placed in this container. In addition, although not visible in this black and white drawing, the color of area 654 surrounding the container number corresponds to the color of the container to make it even easier for operator 50 to know where the item is to be placed. In this example, region 654 is colored blue to indicate that container 602 ("T8001") is also colored blue.

At location 660 on display 650, the bin location, in this case "L-01-047-B", which corresponds to bin location 630 in FIG. 10 proximate robot 18a is displayed for operator 50a to read. Also on display 650 is the item, in this case a "shirt", as well as the size "medium", the color "blue" and the quantity "1", shown at 662. The UPC code may also be provided for the operator to verify an exact item match. From this information, the operator can readily locate the item in the identified bin location and place it in the proper container in the storage array 44a.

Alternatively, instead of executing a series of "pick" orders for each of the containers in the storage array, the storage array may be loaded with items by the operator when the order includes "place" tasks for each of the containers. This order information is provided to the operator via the tablet display and the operator loads the containers according to the orders generated. The place orders are executed in a manner corresponding to the pick orders described above.

Once operator 50a has completed a task (e.g. pick or place) with respect to robot 18a, FIG. 10, the operator must decide where to move to assist another robot in performing a task in connection with an order that the robot is executing. Referring again to FIG. 1, in a typical warehouse there may be many robots traversing the warehouse and many human operators assisting the robots to perform tasks as the robots execute their orders. If the human operators are left to their own devices to find/select which robot to assist next after the completion of a task with another robot, it will be appreciated that overall warehouse performance and efficiency will not be optimized.

A situation that may arise and result in inefficiency is when a human operator completes a task with a robot in an aisle and is ready to move to the next robot to assist but there are no robots needing assistance in sight. The operator could simply wait for a robot to approach or the operator may guess and head in a particular direction hoping to locate a robot in need of assistance. This approach is not particularly effective.

Other inefficiencies can occur when there are multiple human operators servicing an area with multiple robots. Without guidance or direction multiple human operators may pursue the same robot and once realized they will need to reconcile with each other who will assist the target robot and who will find another robot to assist.

In order to address these inefficiencies, on display 650, FIG. 11, in addition to displaying information regarding the item currently being acted on by operator 50a, such information being displayed in area 670 of display 650, there is also an area 680 displaying a plan view of all or a portion of the warehouse, including shelving units and icons of other robots traversing the warehouse proximate the robot.

Each robot includes a processor, e.g. processor 32, FIG. 2, which is configured to display a plan view of a predetermined area surrounding the robot, which typically represents a portion of the warehouse in proximity to the robot but it could a view of the entire warehouse. The warehouse may be divided into a plurality of regions and the predetermined area surrounding the robot could correspond to the one of the plurality of regions in which the robot is located.

On the display are the shelving units and icons representing other robots within a predetermined area. The processor of the robot is in communication with a management server, i.e. management server 15, FIG. 1, which provides the processor with the display information regarding the other robots in the predetermined area as well as the status indicators for the robots.

Referring again to FIG. 11, in area 680 of display 650, there are displayed shelving units 682 and 684 with icons 686 representing a human operator attending to an order associated with robot 688 proximate shelving unit 684. The display 650 in this case is associated with robot 688, so operator 686 may look at the display and observe that there is another robot 690 proximate shelving unit 684 but in the next aisle and not visible to the operator. Without the use of the display 650, the operator would either wait for another robot to approach or the operator would wander in a particular direction hoping to locate another robot in need of assistance. Neither approach is particularly effective. It should be noted that, while human operator 686 is depicted in area 680 of display 650 this is not a required feature of the invention. The operator is depicted in this example for illustrative purposes only.

In another embodiment, the human operator may actively claim the next robot to assist. This may be accomplished by providing the display device with an input device, e.g. a touch screen, for enabling the operator to select the next robot of the other robots to assist. In this case, the management server would also be configured to change the status of the robot selected by the operator to indicate that the robot has been selected by a particular operator so that other human operators in the area will not try to assist/claim that robot. The status indicator may be represented by color, a change in intensity of the image of the icon, or the icon could be made to blink, flash, or pulse.

Figure 12:
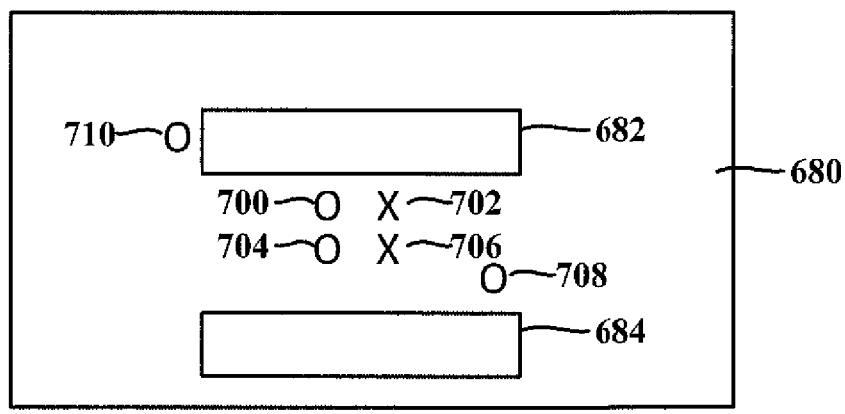
FIG. 12 is a view of the display of the tablet as shown in FIG. 11 with an alternate configuration of robots.

A benefit of the above described embodiment is illustrated in FIG. 12, in which portion 680 of display 650 of FIG. 11, is shown with a different configuration of robots and operators. Here, an icon 700 for the robot displaying the image is shown being assisted by operator 702 proximate shelving unit 682. In the image, there is another robot represented by icon 704 being assisted by operator 706 proximate shelving unit 684. As operators 702 and 706 complete tasks with their respective robots, they will need to decide which robot to approach next. Without the display 680, according to this invention, they would likely both be inclined to approach the robot represented by icon 708, since it is located near them and there are no other robots in their lines of sight. However, with the display 680 operator 702 (and operator 706 on the display associated with robot 704) will see that another robot 710 at the end of shelving unit 682 is approaching.

Inefficiencies and confusion may be avoided by allowing the operators to select their next robot to assist by using an input device. For example, if operator 702 completes the task associated with robot 700 before operator 706 completes the task associated with robot 704, operator 702 would select one of robots 708 or 710 to attend to by selecting the desired robot using the input device, e.g. by touching display 680. The management server would receive this input and display the selected robot with an appropriate status indicator to show that it has been selected. When operator 706 completes the task associated with robot 704, she will see that robot 708 is not available, but incoming robot 710 is available and operator 706 may then select robot 710 in the same manner.

While the foregoing description of the invention enables one of ordinary skill to make and use what is considered presently to be a preferred embodiment thereof, those of ordinary skill will understand and appreciate the existence of variations, combinations, and equivalents of the specific embodiments and examples herein. Alterations, modifications and variations may be effected to the particular embodiments by those of skill in the art without departing from the scope of the invention.

Having described the invention, and a preferred embodiment thereof, what is claimed as new and secured by letters patent is:

1. A robot capable of autonomously navigating through a warehouse among a plurality of other robots and a plurality of human operators, wherein the robots are configured to execute orders for items at locations in the warehouse with the assistance of the human operators, the robot comprising:
    a mobile base unit to propel the robot through the warehouse to locations corresponding to items in an order to be executed;
    a display device having a display area to allow the human operators to interact with the robot; and
    a processor in communication with the display device, the processor is configured to display on a first portion of the display area, information corresponding to an item of an order, wherein an operator uses the information to assist the robot to execute the order at a first location; and
    the processor is further configured to display on a second portion of the display area, icons representing other robots within a predetermined area surrounding the first location.

2. The robot of claim 1 wherein the display device is affixed to an armature that is coupled to the mobile base unit.

3. The robot of claim 1 wherein the information on the first portion of the display area includes one or more of: bar code identification, bin location, item description, item quantity, item size, item image, and item color.

4. The robot of claim 1 wherein the warehouse is divided into a plurality of regions and the predetermined area surrounding the robot at the first location is one of the plurality of regions where the robot is located.

5. The robot of claim 1 wherein the processor is in communication with a management server and a status indicator for each of the other robots is received from the management server.

6. The robot of claim 1 wherein the icons of the other robots include a status indicator to allow the operator to select one of the other robots to assist in executing an order.

7. The robot of claim 6 wherein the status indicator of the other robots comprises at least one of: a color, a number, a change in intensity of the icon, or a blinking, flashing, or pulsing icon.

8. The robot of claim 6 wherein the display device includes an input device for enabling the operator to select one of the other robots to assist in executing an order, and wherein the management server is configured to change a status of the other robot selected by the operator to indicate that said other robot has been selected by the operator.

9. A method for autonomously navigating a robot through a warehouse among a plurality of other robots and a plurality of human operators, wherein the robots are configured to execute orders for items at locations in the warehouse with the assistance of the human operators, the method comprising:
    propelling a mobile base unit of the robot through the warehouse to a first location corresponding to an item in an order to be executed;
    displaying on a first portion of a display device having a display area, information corresponding to the item on which an operator is to assist the robot execute the order, and displaying on a second portion of the display device icons representing other robots within a predetermined area surrounding the first location.

10. The method of claim 9 wherein the display device is affixed to an armature that is coupled to the mobile base unit.

11. The method of claim 9 wherein the information on the first portion of the display includes one or more of: bar code identification, bin location, item description, item quantity, item size, item image, and item color.

12. The method of claim 9 wherein the warehouse is divided into a plurality of regions and the predetermined area surrounding the robot at the first location is one of the plurality of regions where the robot is located.

13. The method of claim 9 further comprising receiving from a management server a status indicator for each of the other robots.

14. The method of claim 9 wherein the icons of the other robots are provided with a status indicator to allow the operator to select one of the other robots to assist in executing an order.

15. The method of claim 14 wherein the status indicator of the other robots comprises at least one of: a color, a number, a change in intensity of the image of the icon, or a blinking, flashing, or pulsing icon.

16. The method of claim 14 further comprising selecting by the operator, using the display device, one of the other robots to assist in executing an order, and changing a status of the other robot selected by the operator to indicate that said other robot has been selected by the operator.

17. A robot capable of autonomously navigating through a warehouse among a plurality of other robots and a plurality of human operators, wherein the robots are configured to execute orders for items at locations in the warehouse with the assistance of the human operators, the robot comprising:
   a mobile base unit to propel the robot through the warehouse to locations corresponding to items in an order to be executed;
   a display device having a display area to allow the human operators to interact with the robot; and
   a processor in communication with the display device, the processor is configured to display on a first portion of the display area, information corresponding to an item of an order, wherein an operator uses the information to assist the robot to execute the order at a first location; and
   the processor is further configured to display on a second portion of the display area, icons representing other robots within a predetermined area surrounding the first location, wherein the icons of the other robots each include a status indicator to indicate a status of the other robots.

18. A method for autonomously navigating a robot through a warehouse among a plurality of other robots and a plurality of human operators, wherein the robots are configured to execute orders for items at locations in the warehouse with the assistance of the human operators, the method comprising:
   propelling a mobile base unit of the robot through the warehouse to a first location corresponding to an item in an order to be executed;
   displaying on a first portion of a display device having a display area, information corresponding to the item on which an operator is to assist the robot execute the order, and displaying on a second portion of the display device icons representing other robots within a predetermined area surrounding the first location, wherein the icons of the other robots are provided with a status indicator to allow the operator to select a next robot of the other robots to assist in executing an order.

* * * * *